(12) United States Patent
Jiang et al.

(10) Patent No.: US 10,488,839 B2
(45) Date of Patent: Nov. 26, 2019

(54) METHOD AND APPARATUS FOR CONTROLLING AND MANAGING AN INDUSTRY PROCESS USING AN INDUSTRY INTERNET OPERATING SYSTEM

(71) Applicant: KYLAND TECHNOLOGY CO., LTD., Beijing (CN)

(72) Inventors: Qiyun Jiang, Beijing (CN); Shengqin Xu, Beijing (CN); Weikang Guo, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 60 days.

(21) Appl. No.: 15/638,460

(22) Filed: Jun. 30, 2017

(65) Prior Publication Data

US 2018/0224820 A1 Aug. 9, 2018

(30) Foreign Application Priority Data

Feb. 9, 2017 (CN) .......................... 2017 1 0071585

(51) Int. Cl.
*G05B 19/042* (2006.01)
*H04L 29/08* (2006.01)

(52) U.S. Cl.
CPC .......... *G05B 19/0426* (2013.01); *G05B 2219/15012* (2013.01); *H04L 67/125* (2013.01)

(58) Field of Classification Search
None
See application file for complete search history.

(56) References Cited

U.S. PATENT DOCUMENTS

| 2004/0015572 | A1* | 1/2004 | Kang | ....................... H04B 3/54 709/220 |
| 2005/0270063 | A1* | 12/2005 | Cornett | ................ G05B 19/056 326/39 |

(Continued)

FOREIGN PATENT DOCUMENTS

| EP | 2806319 A2 | 11/2014 |
| JP | 1139010 A | 2/1999 |

(Continued)

OTHER PUBLICATIONS

R. A. Frost, Binary-Relational Storage Structures, The Computer Journal, vol. 25, Issue 3, Aug. 1982, pp. 358-367; retrieved from https://academic.oup.com/comjnl/article/25/3/358/369833 on Sep. 18, 2019 (Year: 1982).*

(Continued)

*Primary Examiner* — Mohammad Ali
*Assistant Examiner* — Joshua T Sanders
(74) *Attorney, Agent, or Firm* — Arent Fox LLP; Michael Fainberg (57) ABSTRACT

Disclosed are a method and apparatus for controlling and managing an industry process using an industry internet operating system. In the method, interfaces with same type of function from different manufacturers are integrated in a function interface library created over a development platform to assist a developer in programming PLC rapidly and more efficiently to address problems in the prior art of lower reuse rate of codes, degrading efficiency of programming, because the PLC has to be programmed respectively for terminals from different manufacturers. In the invention, a framework of a software defined industry process, and a unified set of industry object models are created so that various integrated heterogeneous field devices, and an industry production process to be controlled and managed can communicate and interoperate with each other in an (Continued)

industry internet architecture to thereby accommodate highly real-time and efficient production in a discrete industry and a process industry.

8 Claims, 3 Drawing Sheets

(56) References Cited

U.S. PATENT DOCUMENTS

| | | | |
|---|---|---|---|
| 2010/0229151 A1* | 9/2010 | Yuan | G05B 19/056 717/104 |
| 2018/0136910 A1* | 5/2018 | Noetzelmann | G05B 19/0426 |

FOREIGN PATENT DOCUMENTS

| | | | |
|---|---|---|---|
| JP | 200336122 A | 2/2003 | |
| JP | 2005251120 A | 9/2005 | |
| WO | 2016195690 A1 | 12/2016 | |

OTHER PUBLICATIONS

Abstract of "Acrivex which makes old feel Java Beans using the advantage that start later", by Kitago Taturo, Nikkei electronics, Nikkei BP, Dec. 16, 1996.

* cited by examiner

METHOD AND APPARATUS FOR CONTROLLING AND MANAGING AN INDUSTRY PROCESS USING AN INDUSTRY INTERNET OPERATING SYSTEM

CROSS-REFERENCE TO RELATED APPLICATION

This application claims priority of Chinese Patent Application No. 201710071585.X, filed on Feb. 9, 2017, which is hereby incorporated by reference in its entirety.

FIELD

The present invention relates to the field of industry internet operating systems, and particularly to a method and apparatus for controlling and managing an industry process using an industry internet operating system.

BACKGROUND

At present, a soft Programmable Logic Controller (PLC) has been developing rapidly. As the so-called PLC refers to, control functions of a PLC are encapsulated in a piece of software to be run in a personal computer environment. With the high flexibility of the soft PLC, the PLC with different types of functions can be deployed rapidly as needed.

Generally in PLC programming, data dictionaries of a managed terminal need to be known in advance, and the PLC programming is based upon the different data dictionaries. Moreover if a user A and a user B intend to program the PLC to perform the same function, then the user A will program it, and also the user B will program it, thus degrading the efficiency and flexibility of programming, and discouraging the codes from being reused, while the PLC is being programmed for the different users in the prior art.

SUMMARY

Embodiments of the invention provide a method and apparatus for controlling and managing an industry process using an industry internet operating system so as to address the problems in the prior art that the efficiency and flexibility of programming may be degraded, and the codes may be discouraged from being reused, while the PLC is being programmed for the different users.

In an aspect, an embodiment of the invention provides a method for controlling and managing an industry process using an industry internet operating system, the method includes:

obtaining configuration parameters of a first user for generating a soft Programmable Logic Controller (PLC), wherein the configuration parameters include at least a second user identifier, a specified device identifier, and a specified function interface identifier; and if the specified device identifier, and the specified function interface identifier, corresponding to the second user identifier are retrieved from a preset interface library, then generating a piece of soft PLC program according to the retrieved specified device identifier and specified function interface identifier.

In another aspect, an embodiment of the invention further provides an apparatus for controlling and managing an industry process using an industry internet operating system, the apparatus includes:

an obtaining module configured to obtain configuration parameters of a first user for generating a soft Programmable Logic Controller (PLC), wherein the configuration parameters include at least a second user identifier, a specified device identifier, and a specified function interface identifier; and a program generating module configured, if the specified device identifier, and the specified function interface identifier, corresponding to the second user identifier are retrieved from a preset interface library, to generate a piece of soft PLC program according to the retrieved specified device identifier and specified function interface identifier.

In a further aspect, an embodiment of the invention further provides a nonvolatile computer storage medium storing thereon computer executable instructions configured to perform the method for controlling and managing an industry process using an industry internet operating system according to any one of embodiments above of the invention.

In a further aspect, an embodiment of the invention further provides an electronic device including: at least one processor; and a memory; wherein the memory stores thereon program executable by the at least one processor, and the instructions are executed by the at least one processor to enable the at least one processor to perform the method for controlling and managing an industry process using an industry internet operating system according to any one of the embodiments above of the invention.

In a further aspect, an embodiment of the invention further provides a computer program product including computer program stored on a nonvolatile computer readable storage medium, wherein the computer program includes program instructions executable by a computer to enable the computer to perform the method for controlling and managing an industry process using an industry internet operating system according to any one of the embodiments above of the invention.

Advantageous effects of the embodiments of the invention are as follows: with the method and apparatus for controlling and managing an industry process using an industry internet operating system according to the embodiments of the invention, in the technical solutions according to the embodiments of the invention, the configuration parameters of the first user for generating a soft Programmable Logic Controller (PLC) are obtained, where the configuration parameters include at least the second user identifier, the specified device identifier, and the specified function interface identifier; and if the specified device identifier, and the specified function interface identifier, corresponding to the second user identifier are retrieved from the preset interface library, then a piece of soft PLC program will be generated according to the retrieved specified device identifier and specified function interface identifier, so that the same piece of soft PLC program can be shared among different users to thereby encourage the codes from being reused, and improve the efficiency and flexibility of programming.

BRIEF DESCRIPTION OF THE DRAWINGS

In order to make the technical solutions in the embodiments of the invention more apparent, the drawings to be used in a description of the embodiments will be briefly introduced below, and apparently the drawings to be described below are merely illustrative of some embodiments of the invention, and those ordinarily skilled in the art can derive from these drawings other drawings without any inventive effort. In the drawings.

DETAILED DESCRIPTION OF THE EMBODIMENTS

In order to make the objects, the technical solutions and the advantages of the invention more apparent, the invention will be further described in details with reference to the drawings. Apparently the described embodiments are only a part but all of the embodiments of the invention. Based upon the embodiments of the invention here, all of other embodiments derived by those ordinarily skilled in the art without any inventive effort shall come into the scope of the invention.

In a real application, an industry internet operating system is an underlying system to enable networked industry control, cloud industry control, a visualized factory, an analysis of big industry data, etc., and also is a unified platform to enable a control information flow, a management information flow, and a supply link information flow to be integrated with each other, so that the controllability of an industry field can be guaranteed.

Figure 1:
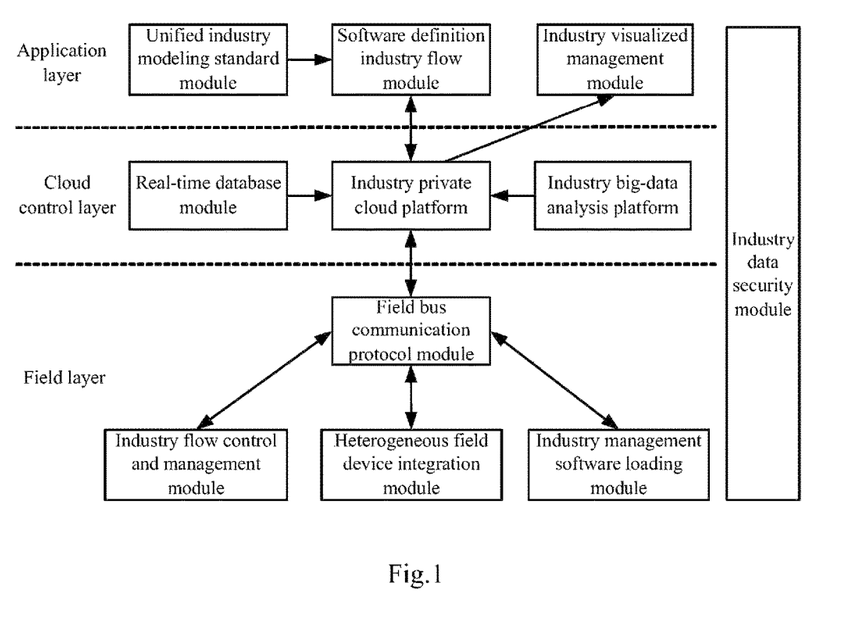
FIG. 1 illustrates a functionally architectural diagram of an industry internet operating system according to a particular embodiment of the invention.

In the functionally architectural diagram of an industry internet operating system as illustrated in FIG. 1, the industry internet operating system includes at least an application layer, a cloud control layer, and a field layer, where the application layer includes at least a unified industry modeling standard module, a software defined industry process module, and an industry visualized management module; the cloud control layer includes at least a real-time database, an industry private cloud platform, and a big industry data analysis platform; and the field layer includes at least an field bus communication protocol module, an industry process control and management module, a heterogeneous field device integration module, and an industry management software loading module. Moreover the industry internet operating system further includes an industry data security module covering the application layer, the cloud control layer, and the field layer.

For the industry process control and management module, a Programmable Logic Controller (PLC) has to be programmed respectively for terminals from different manufacturers, thus discouraging the codes from being reused, degrading the efficiency of programming, etc., in the prior art, and in order to solve these problems, in embodiments of the invention, obtaining configuration parameters of a first user for generating a soft Programmable Logic Controller (PLC), where the configuration parameters include at least a second user identifier, a specified device identifier, and a specified function interface identifier; and if the specified device identifier, and the specified function interface identifier, corresponding to the second user identifier are retrieved from a preset interface library, then a piece of soft PLC program will be generated according to the retrieved specified device identifier and specified function interface identifier, so that the same piece of soft PLC program can be shared among different users to thereby encourage the codes from being reused, and improve the efficiency and flexibility of programming.

The solution according to the invention will be described below in details in connection particular embodiments thereof, and of course, the invention will not be limited to the following embodiments.

First Embodiment

Figure 2:
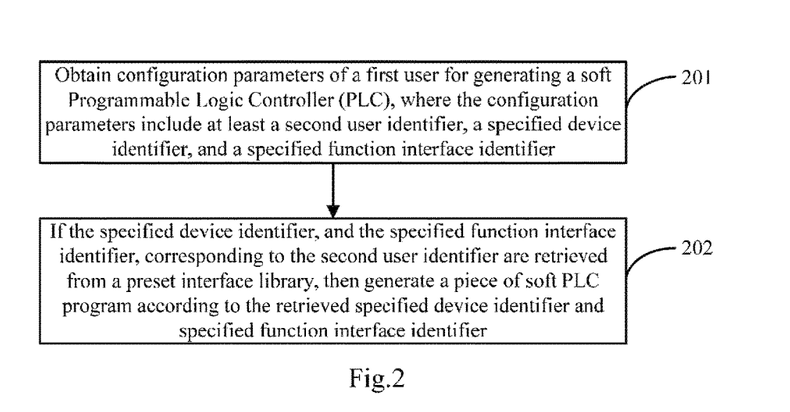
FIG. 2 illustrates a schematic flow chart of a method for controlling and managing an industry process using an industry internet operating system according to a first embodiment of the invention.

As illustrated in FIG. 2, there is a schematic flow chart of a method for controlling and managing an industry process using an industry internet operating system according to an embodiment of the invention, where the method includes the following steps:

The step 201 is to obtain configuration parameters of a first user for generating a soft Programmable Logic Controller (PLC), where the configuration parameters include at least a second user identifier, a specified device identifier, and a specified function interface identifier; and The step 202 is, if the specified device identifier, and the specified function interface identifier, corresponding to the second user identifier are retrieved from a preset interface library, to generate a piece of soft PLC program according to the retrieved specified device identifier and specified function interface identifier.

Here in an embodiment of the invention, in order to facilitate a search in the interface library for the specified device identifier, and the specified function interface identifier, corresponding to the second user identifier, the method can further include the following steps:

The step A1 is to receive a function registration request of a registered user, where the function registration request includes at least a user identifier of the registered user, a device identifier of the registered user, and a function interface identifier of the registered user.

Here the user identifier of the registered user can be a name, identity (ID), etc., of the registered user. The device identifier of the registered user can be a device type ID, etc., of the registered user. The function interface identifier of the registered user can be a physical address, etc., of a function interface.

In a particular implementation, in order to facilitate unified management, different registered users can be guided by a registration guiding manual to access the same function of the same type of device using the same device identifier and function interface identifier. That is, there may be a plurality of device identifiers, and a plurality of user identifiers, corresponding to the same function interface identifier in a correspondence relationship among a user identifier, a device identifier, and a function interface identifier.

The step A2 is to add a correspondence relationship among the user identifier of the registered user, the device identifier of the registered user, and the function interface identifier of the registered user to the preset interface library in response to the registration request.

Here the preset interface library can be exemplified in Table 1 below:

TABLE 1

| User identifier of registered user | Device identifier of registered user | Function interface identifier of registered user |
|---|---|---|
| User C1 | Device D1 | Function interface F11 |
|  |  | Function interface F12 |
|  |  | Function interface F . . . |
|  | Device D2 | Function interface F21 |
|  |  | Function interface F22 |
|  |  | Function interface F . . . |
|  | Device D . . . | Function interface F . . . |
| User C2 | Device . . . | Function interface . . . |

For the sake of convenient understanding, the method for controlling and managing an industry process using an industry internet operating system according to embodiments of the invention will be further described below as follows:

Here in an embodiment of the invention, a query request for searching for a device identifier corresponding to at least one function interface identifier to be queried is received; and as a result of the search according to the correspondence relationship among a user identifier, a device identifier, and a function interface identifier, the device identifiers corresponding to the respective function interface identifiers to be queried are output. In this way, if there are such devices of a plurality of registered users that include a function interface to be queried by the first user, then the first user will select his or her most desirable one of the devices of the registered users among the output device identifiers corresponding to the respective function interface identifiers to be queried, thus improving the experience of the user.

For example, there are two registered users C1 and C2 in the interface library, where a device D1 of the user C1 can provide function interfaces F11, F12, and F13; and a device D2 of the user C2 can provide function interfaces F11 and F12. If the first user requests for the function interfaces F11 and F12, then the device D1 of the user C1, and the device D2 of the user C2 will be output. If the first user requests for the function interfaces F11, F12, and F13, then the device D1 of the user C1 will be output.

Here in an embodiment of the invention, sometimes parameters in a function corresponding to such a function interface identifier in the interface library that is desirable to the user (e.g., a developer) may be not identical to parameters desirable in a real application thereof. Sometimes the correspondence relationship among a user identifier, a device identifier, and a function interface identifier in the interface library may vary, for example, if a registered user A in the interface library is purchased by a registered user B, then a device identifier and a function interface identifier corresponding to the registered user A will actually correspond to the registered user B. In order to enable the user to be provided with an accurate piece of soft PLC program, the method can further include the following steps:

The step B1 is to receive a modification instruction configured to modify a specified parameter in a function corresponding to a function interface identifier, and/or to modify the specified correspondence relationship among a user identifier, a device identifier, and a function interface identifier in the interface library.

The step B2 is to invoke an abstract function interface in response to the modification instruction to modify accordingly, where an abstract function interface corresponds to a specified set of function interface identifiers, and is configured to modify the specified parameters of the function corresponding to the set of function interface identifiers, and/or to modify the at least one correspondence relationship in the interface library corresponding to the set of function interface identifiers.

Here the abstract function interface, and the specified set of function interface identifiers, and the specified parameter thereof, which can be modified can be as exemplified in Table 2 below:

TABLE 2

| Abstract function interface A1 | Function interface F11 | Parameter h11 |
|  |  | Parameter h21 |
|  |  | Parameter h . . . |
|  | Function interface F12 | Parameter h21 |
|  |  | Parameter h22 |
|  |  | Parameter h . . . |
|  | Function interface F . . . | Parameter h . . . |
| Abstract function interface A2 | Function interface . . . | Parameter. . . |

Accordingly, for example, if the parameter h11 in a function corresponding to the function interface F11 of a temperature sensor D1 registered by a registered user C1 in the interface library is 10 centigrade degrees, where the parameter is so configured that if the temperature in an office building where the registered user C1 is located is below 10 centigrade degrees, then an air conditioner will be started automatically. However a parameter in a function corresponding to a function interface of a temperature sensor to be developed by the first user (e.g., a developer) is 15 centigrade degrees. At this time, since the abstract function interface can modify the specified parameter of the function corresponding to the set of function interface identifier, that is, modify the parameter h11 to 15 centigrade degrees, the first user can be provided with an accurate piece of soft PLC program, thus facilitating further development and use thereof.

Here in an embodiment of the invention, in order to facilitate obtainment of the configuration parameters, the step 201 (where the configuration parameters of the first user for generating a soft Programmable Logic Controller (PLC) are obtained) can be performed particularly by receiving a configuration file of the first user, and retrieving the configuration parameters from the configuration file.

In a particular implementation, any method for obtaining configuration parameters in the prior art can be applicable to this embodiment without departing from the scope of the invention, but the embodiments of the invention will not be limited thereto.

In summary, in the technical solution according to the embodiments of the invention, the configuration parameters of the first user for generating a soft Programmable Logic Controller (PLC) are obtained, where the configuration parameters include at least the second user identifier, the specified device identifier, and the specified function interface identifier; and if the specified device identifier, and the specified function interface identifier, corresponding to the second user identifier are retrieved from the preset interface library, then a piece of soft PLC program will be generated according to the retrieved specified device identifier and specified function interface identifier, so that the same piece of soft PLC program can be shared among different users to thereby encourage the codes from being reused, and improve the efficiency and flexibility of programming.

Second Embodiment

Figure 3:
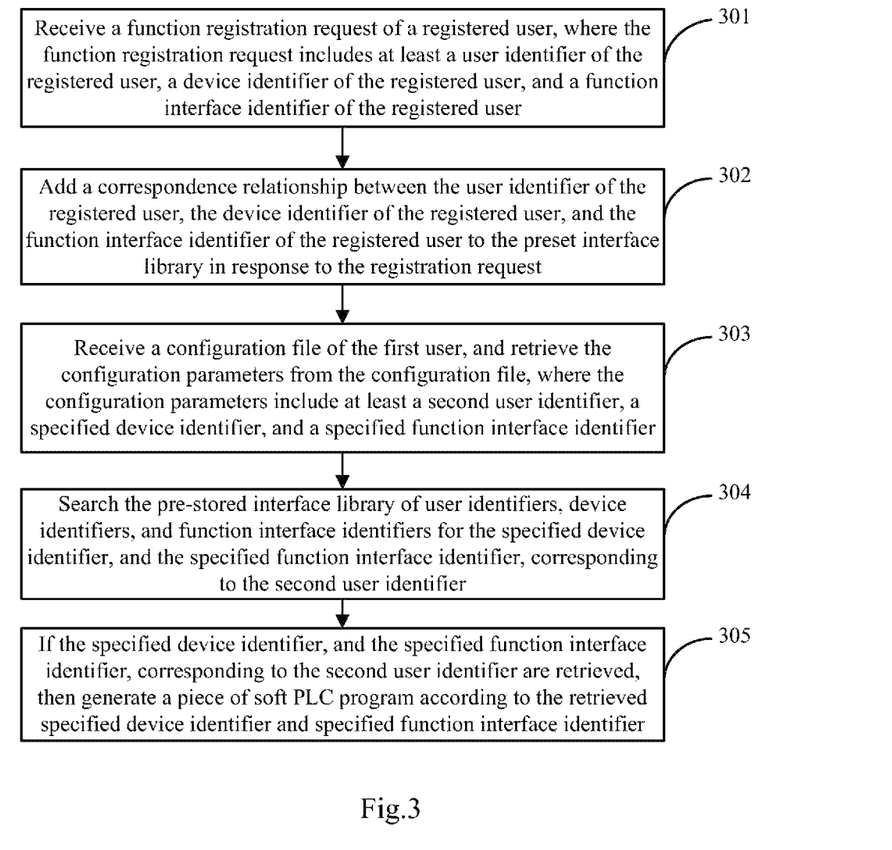
FIG. 3 illustrates a schematic flow chart of a method for controlling and managing an industry process using an industry internet operating system according to a second embodiment of the invention.

For the sake of further understanding of the method for controlling and managing an industry process using an industry internet operating system according to the embodiments of the invention, this method will be further described below in an embodiment of the invention. As illustrated in FIG. 3, the method includes the following steps:

The step 301 is to receive a function registration request of a registered user, where the function registration request includes at least a user identifier of the registered user, a device identifier of the registered user, and a function interface identifier of the registered user.

The step 302 is to add a correspondence relationship among the user identifier of the registered user, the device identifier of the registered user, and the function interface identifier of the registered user to the preset interface library in response to the registration request.

The step 303 is to receive a configuration file of the first user, and to retrieve the configuration parameters from the configuration file, where the configuration parameters include at least a second user identifier, a specified device identifier, and a specified function interface identifier.

The step 304 is to search the pre-stored interface library of user identifiers, device identifiers, and function interface identifiers for the specified device identifier, and the specified function interface identifier, corresponding to the second user identifier.

The step 305 is, if the specified device identifier, and the specified function interface identifier, corresponding to the second user identifier are retrieved, to generate a piece of soft PLC program according to the retrieved specified device identifier and specified function interface identifier.

In the technical solution according to the embodiment of the invention, the configuration parameters of the first user for generating a soft Programmable Logic Controller (PLC) are obtained, where the configuration parameters include at least the second user identifier, the specified device identifier, and the specified function interface identifier; and if the specified device identifier, and the specified function interface identifier, corresponding to the second user identifier are retrieved from the preset interface library, then a piece of soft PLC program will be generated according to the retrieved specified device identifier and specified function interface identifier, so that the same piece of soft PLC program can be shared among different users to thereby encourage the codes from being reused, and improve the efficiency and flexibility of programming.

Third Embodiment

Based upon the same inventive idea, an embodiment of the invention further provides an apparatus for controlling and managing an industry process using an industry internet operating system, and the principle of the apparatus for controlling and managing an industry process using an industry internet operating system is similar to that of the method above for controlling and managing an industry process using an industry internet operating system, so reference can be made to the method above for details of the apparatus, and a repeated description thereof will be omitted here.

Figure 4:
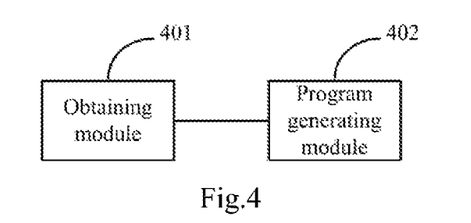
FIG. 4 illustrates a schematic structural diagram of an apparatus for controlling and managing an industry process using an industry internet operating system according to a third embodiment of the invention.

As illustrated in FIG. 4, there is a schematic structural diagram of the apparatus including:

An obtaining module 401 is configured to obtain configuration parameters of a first user for generating a soft Programmable Logic Controller (PLC), where the configuration parameters include at least a second user identifier, a specified device identifier, and a specified function interface identifier; and A program generating module 402 is configured, if the specified device identifier, and the specified function interface identifier, corresponding to the second user identifier are retrieved from a preset interface library, to generate a piece of soft PLC program according to the retrieved specified device identifier and specified function interface identifier.

Here in an embodiment of the invention, the apparatus further includes: a function registration request receiving module configured to receive a function registration request of a registered user, where the function registration request includes at least a user identifier of the registered user, a device identifier of the registered user, and a function interface identifier of the registered user; and An adding module configured to add a correspondence relationship among the user identifier of the registered user, the device identifier of the registered user, and the function interface identifier of the registered user to the preset interface library in response to the registration request.

Here in an embodiment of the invention, the apparatus further includes: a query request receiving module configured to receive a query request for searching for a device identifier corresponding to at least one function interface identifier to be queried; and An outputting module configured to output the device identifiers corresponding to the respective function interface identifiers to be queried, as a result of the search.

Here in an embodiment of the invention, the apparatus further includes: a modification instruction receiving module configured to receive a modification instruction configured to modify a specified parameter in a function corresponding to a function interface identifier, and/or to modify the specified correspondence relationship among a user identifier, a device identifier, and a function interface identifier in the interface library; and A modifying module configured to invoke an abstract function interface in response to the modification instruction configured to modify accordingly, where an abstract function interface corresponds to a specified set of function interface identifiers, and is configured to modify the specified parameter of the function corresponding to the set of function interface identifiers, and/or to modify the at least one correspondence relationship in the interface library corresponding to the set of function interface identifiers.

Here in an embodiment of the invention, the obtaining module is configured to receive a configuration file of the first user, and to retrieve the configuration parameters from the configuration file.

In summary, in the apparatus for controlling and managing an industry process using an industry internet operating system according to the embodiments of the invention, the obtaining module obtains the configuration parameters of the first user for generating a soft Programmable Logic Controller (PLC), where the configuration parameters include at least the second user identifier, the specified device identifier, and the specified function interface identifier; and if the specified device identifier, and the specified function interface identifier, corresponding to the second user identifier are retrieved from the preset interface library, then the program generating module will generate a piece of soft PLC program according to the retrieved specified device identifier and specified function interface identifier, so that the same piece of soft PLC program can be shared among different users to thereby encourage the codes from being reused, and improve the efficiency and flexibility of programming.

Fourth Embodiment

The fourth embodiment of the invention provides a nonvolatile computer storage medium storing thereon computer executable instructions configured to perform the method for controlling and managing an industry process using an industry internet operating system according to any one of the method embodiments above.

Here the nonvolatile computer storage medium according to the embodiment of the invention stores thereon the computer executable instructions configured:

To obtain configuration parameters of a first user for generating a soft Programmable Logic Controller (PLC), where the configuration parameters include at least a second user identifier, a specified device identifier, and a specified function interface identifier; and If the specified device identifier, and the specified function interface identifier, corresponding to the second user identifier are retrieved from a preset interface library, to generate a piece of soft PLC program according to the retrieved specified device identifier and specified function interface identifier.

Here in an embodiment of the invention, the computer executable instructions are further configure:

To receive a function registration request of a registered user, where the function registration request includes at least a user identifier of the registered user, a device identifier of the registered user, and a function interface identifier of the registered user; and To add a correspondence relationship among the user identifier of the registered user, the device identifier of the registered user, and the function interface identifier of the registered user to the preset interface library in response to the registration request.

Here in an embodiment of the invention, the computer executable instructions are further configure:

To receive a query request for searching for a device identifier corresponding to at least one function interface identifier to be queried; and To output the device identifiers corresponding to the respective function interface identifiers to be queried, as a result of the search.

Here in an embodiment of the invention, the computer executable instructions are further configure:

To receive a modification instruction configured to modify a specified parameter in a function corresponding to a function interface identifier, and/or to modify the specified correspondence relationship among a user identifier, a device identifier, and a function interface identifier in the interface library; and To invoke an abstract function interface in response to the modification instruction configured to modify accordingly, where an abstract function interface corresponds to a specified set of function interface identifiers, and is configured to modify the specified parameter of the function corresponding to the set of function interface identifiers, and/or to modify the at least one correspondence relationship in the interface library corresponding to the set of function interface identifiers.

Here in an embodiment of the invention, the computer executable instructions are configured to obtain the configuration parameters of the first user for generating a soft Programmable Logic Controller (PLC) by:

Receiving a configuration file of the first user, and retrieving the configuration parameters from the configuration file.

Fifth Embodiment

Figure 5:
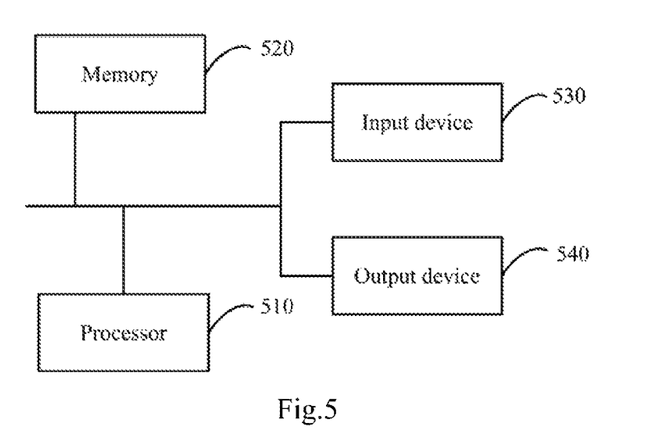
FIG. 5 illustrates a schematic structural diagram of hardware of an electronic device in which a method for controlling and managing an industry process using an industry Internet operating system according to a fifth embodiment of the invention is performed.

FIG. 5 is a schematic structural diagram of hardware of an electronic device in which the method for controlling and managing an industry process using an industry Internet operating system is performed according to a fifth embodiment of the invention, and as illustrated in FIG. 5, the electronic device includes:

One or more processors 510, and a memory 520, where one processor 510 is illustrated in FIG. 5 by way of an example. The electronic device in which the method for controlling and managing an industry process using an industry Internet operating system is performed can further includes an input device 530 and an output device 540.

The processor 510, the memory 520, the input device 530, and the output device 540 can be connected via a bus or otherwise, although they are connected over a bus in FIG. 5 by way of an example.

The memory 520 is a nonvolatile computer readable storage medium configured to store nonvolatile software program, nonvolatile computer executable program, and modules, e.g., program instructions/modules corresponding to the method for controlling and managing an industry process using an industry Internet operating system according to the embodiments of the invention (e.g., the obtaining module 401 and the program generating module 402 illustrated in FIG. 4). The processor 510 is configured to execute the nonvolatile software program, the instructions, and the modules in the memory 520 to thereby perform various functional application of and data processing by a server, i.e., perform the method for controlling and managing an industry process using an industry internet operating system according to the method embodiments above.

The memory 520 can include a program storage area and a data storage area, where an operating system, applications required for at least one function, etc., can be stored in the program storage area; and data created for use of the apparatus for controlling and managing an industry process using an industry internet operating system, and the principle of the apparatus for controlling and managing an industry process using an industry internet operating system, etc., can be stored in the data storage area. Moreover the memory 520 can include a high-speed random access memory, and can further include a nonvolatile memory, e.g., at least one magnetic disks memory device, a flash memory device, or another nonvolatile solid memory device. In some embodiments, the memory 520 optionally include a memory arranged remote from the processor 510, where the remote memory can be connected with the apparatus for controlling and managing an industry process using an industry internet operating system over a network. Examples of the network include but will not be limited to the Internet, an enterprise intranet, a local area network, a mobile communication network, and a combination thereof.

The input device 530 can receive input digital or character information, and to generate a key signal input related to user setting and function control in the apparatus for controlling and managing an industry process using an industry Internet operating system. The output device 540 can include a display screen, and other display devices.

The one or more modules are stored in the memory 520, and configured to be executed by the one or more processors 510 to perform the method for controlling and managing an industry process using an industry Internet operating system according to any one of the method embodiments above.

The product above can perform the method according to any one of the embodiments of the invention, and include the functional modules, and achieve the advantageous effects, corresponding to the method. Reference can be made to the description of the method according to the embodiments of the invention for details of the product according to this embodiment.

In a possible implementation, the at least one processor in the electronic device according to the embodiment of the invention is configured:

To obtain configuration parameters of a first user for generating a soft Programmable Logic Controller (PLC), where the configuration parameters include at least a second user identifier, a specified device identifier, and a specified function interface identifier; and If the specified device identifier, and the specified function interface identifier, corresponding to the second user identifier are retrieved from a preset interface library, to generate a piece of soft PLC program according to the retrieved specified device identifier and specified function interface identifier.

In a possible implementation, the at least one processor is further configured: to receive a function registration request of a registered user, where the function registration request includes at least a user identifier of the registered user, a device identifier of the registered user, and a function interface identifier of the registered user; and To add a correspondence relationship among the user identifier of the registered user, the device identifier of the registered user, and the function interface identifier of the registered user to the preset interface library in response to the registration request.

In a possible implementation, the at least one processor is further configured:

To receive a query request for searching for a device identifier corresponding to at least one function interface identifier to be queried; and To output the device identifiers corresponding to the respective function interface identifiers to be queried, as a result of the search.

In a possible implementation, the at least one processor is further configured:

To receive a modification instruction configured to modify a specified parameter in a function corresponding to a function interface identifier, and/or to modify the specified correspondence relationship among a user identifier, a device identifier, and a function interface identifier in the interface library; and To invoke an abstract function interface in response to the modification instruction configured to modify accordingly, where an abstract function interface corresponds to a specified set of function interface identifiers, and is configured to modify the specified parameter of the function corresponding to the set of function interface identifiers, and/or to modify the at least one correspondence relationship in the interface library corresponding to the set of function interface identifiers.

In a possible implementation, the at least one processor is configured to obtain the configuration parameters of the first user for generating a soft Programmable Logic Controller (PLC) by:

receiving a configuration file of the first user, and to retrieve the configuration parameters from the configuration file.

An embodiment of the invention further provides a computer program product including computer program stored on a nonvolatile computer readable storage medium, where the computer program includes program instructions executable by a computer to enable the computer to perform the method for controlling and managing an industry process using an industry internet operating system according to any one of the embodiments above of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for controlling and managing an industry process using an industry internet operating system, the method comprises:

obtaining configuration parameters of a first user for generating a soft Programmable Logic Controller (PLC), wherein the configuration parameters comprise at least a second user identifier, a specified device identifier, and a specified function interface identifier, searching for a specified device identifier corresponding to the second user identifier and a specified function interface identifier corresponding to the second user identifier in a pre-stored interface library, wherein the pre-stored interface library comprises a relationship among a user identifier, a specified device identifier, and a specified function interface identifier, the relationship indicates that one specified function interface identifier corresponds to one or more specified device interfaces and one specified function interface identifier corresponds to one or more user identifiers at least comprising a first user identifier and the second user identifier;

in response to that the specified device identifier corresponding to the second user identifier and the specified function interface identifier corresponding to the second user identifier are respectively identical to the specified device identifier comprised in the configuration parameters and the specified function interface identifier comprised in the configuration parameters, according to the specified device identifier and the specified function interface identifier which are retrieved, generating one piece of soft PLC program to both of the first user and a second user corresponding to the second user identifier;

receiving a query request for searching for a device identifier corresponding to at least one function interface identifier to be queried; and outputting device identifiers corresponding to the respective function interface identifiers to be queried, as a result of the search.

2. The method according to claim 1, wherein the method further comprises:

receiving a function registration request of a registered user, wherein the function registration request comprises at least a user identifier of the registered user, a device identifier of the registered user, and a function interface identifier of the registered user; and adding a correspondence relationship among the user identifier of the registered user, the device identifier of the registered user, and the function interface identifier of the registered user to the preset interface library in response to the registration request.

3. The method according to claim 1, wherein the method further comprises:

receiving a modification instruction configured to modify a specified parameter in a function corresponding to a function interface identifier, and/or to modify the specified correspondence relationship among a user identifier, a device identifier, and a function interface identifier in the interface library; and invoking an abstract function interface in response to the modification instruction configured to modify accordingly, wherein an abstract function interface corresponds to a specified set of function interface identifiers, and is configured to modify the specified parameter of the function corresponding to the set of function interface identifiers, and/or to modify the at least one correspondence relationship in the interface library corresponding to the set of function interface identifiers.

4. The method according to claim 1, wherein the obtaining the configuration parameters of the first user for generating a soft Programmable Logic Controller (PLC) comprises:

receiving a configuration file of the first user, and retrieving the configuration parameters from the configuration file.

5. An apparatus for controlling and managing an industry process using an industry internet operating system, the apparatus comprises at least one processor and a memory configured to store a nonvolatile computer executable program; the at least one processor is configured to execute the nonvolatile computer executable program to:

obtain configuration parameters of a first user for generating a soft Programmable Logic Controller (PLC), wherein the configuration parameters comprise at least a second user identifier, a specified device identifier, and a specified function interface identifier, search for a specified device identifier corresponding to the second user identifier and a specified function interface identifier corresponding to the second user identifier in a pre-stored interface library: wherein the pre-stored interface library comprises a relationship among a user identifier, a specified device identifier, and a specified function interface identifier, the relationship indicates that one specified function interface identifier corresponds to one or more specified device interfaces and one specified function interface identifier corresponds to one or more user identifiers at least comprising a first user identifier and the second user identifier;

in response to that the specified device identifier corresponding to the second user identifier and the specified function interface identifier corresponding to the second user identifier are respectively identical to the specified device identifier comprised in the configuration parameters and the specified function interface identifier comprised in the configuration parameters, according to the specified device identifier and the specified function interface identifier which are retrieved, generate one piece of soft PLC program to both of the first user and a second user corresponding to the second user identifier;

wherein the at least one processor is further configured to execute the nonvolatile computer executable program to:

receive a query request for searching for a device identifier corresponding to at least one function interface identifier to be queried; and output device identifiers corresponding to the respective function interface identifiers to be queried, as a result of the search.

6. The apparatus according to claim 5, wherein the at least one processor is further configured to execute the nonvolatile computer executable program to:

receive a function registration request of a registered user, wherein the function registration request comprises at least a user identifier of the registered user, a device identifier of the registered user, and a function interface identifier of the registered user; and add a correspondence relationship among the user identifier of the registered user, the device identifier of the registered user, and the function interface identifier of the registered user to the preset interface library in response to the registration request.

7. The apparatus according to claim 5, wherein the at least one processor is further configured to execute the nonvolatile computer executable program to:

receive a modification instruction configured to modify a specified parameter in a function corresponding to a function interface identifier, and/or to modify a specified correspondence relationship among a user identifier, a device identifier, and a function interface identifier in the interface library; and a modifying module configured to invoke an abstract function interface in response to the modification instruction configured to modify accordingly, wherein an abstract function interface corresponds to a specified set of function interface identifiers, and is configured to modify the specified parameter of the function corresponding to the set of function interface identifiers, and/or to modify the at least one correspondence relationship in the interface library corresponding to the set of function interface identifiers.

8. The apparatus according to claim 5, wherein the at least one processor is configured to execute the nonvolatile computer executable program to obtain configuration parameters of a first user for generating the PLC by:

receiving a configuration file of the first user, and receiving the configuration parameters from the configuration file.

\* \* \* \* \*